June 1, 1937. S. KARRER 2,082,164
TUBE FITTING
Filed March 13, 1934

INVENTOR
Sebastian Karrer
BY
Cameron, Kerkam + Sutton ATTORNEYS

Patented June 1, 1937

2,082,164

UNITED STATES PATENT OFFICE 2,082,164

TUBE FITTING

Sebastian Karrer, Washington, D. C., assignor to Consolidated Gas Electric Light and Power Company of Baltimore, Baltimore, Md., a corporation of Maryland Application March 13, 1934, Serial No. 715,367

4 Claims. (Cl. 285—86)

This invention relates to fittings used for connecting or coupling tubing under conditions such that the connection or coupling is subjected to freezing temperatures.

In refrigerating systems, for example, light tubing of material such as copper is employed for circulating the refrigerating medium and at various points in the system this tubing must be connected to elements such as pumps and the like. A coupling or fitting is employed for this purpose which usually embodies two threaded members, one of which is provided with an inclined sealing surface, the end of the tube within the fitting being either flared or provided with an enlargement and the flared or enlarged portion being clamped against the sealing surface by the other member of the threaded connection. For guiding and supporting the tube, a portion of the coupling or fitting extends beyond the point where the seal is effected and surrounds the tube.

When couplings or connections of this type are subjected to alternate freezing and thawing temperatures, trouble is often experienced due to moisture collecting in the relatively slight clearance between the supporting portion of the fitting and the tubing, said clearance being ordinarily of such size as to hold moisture by capillary action. This moisture may be due to condensation from the atmosphere or to any other cause, and in spite of efforts to effect a tight fit between the support and the tube or to seal the joint, it gradually works in between the fitting and the tube where it freezes and expands. Over a period of time the result of alternate freezing and thawing is to enlarge progressively the space or cavity between the fitting and the tube so that more and more moisture collects and more and more enlargement of the space or cavity results. Since the fitting has least mass at the end of the supporting portion, freezing may begin at this point and the expansion of the moisture as it freezes takes place inwardly with respect to the fitting. The result often is that the fitting is either cracked or broken or the tube is collapsed within the fitting. In either case it is necessary to stop the operation of the system and remove the fitting in order to repair the damage.

According to the present invention means are provided whereby any collected moisture is permitted to expand on freezing in such a way that no damage to the fitting or the tube results. The invention thus renders it unnecessary to provide a close fit or to seal the joint between the end of the fitting and the tube and prevents damage and destruction which often result with the conventional fitting.

Several embodiments of the invention have been illustrated in the accompanying drawing, and in these embodiments the invention has been illustrated in connection with one type of fitting only, but it is to be expressly understood that said drawing is for purposes of illustration only and are not to be construed as a definition of the limits of the invention, reference being had to the appended claims for this purpose.

Figure 1:
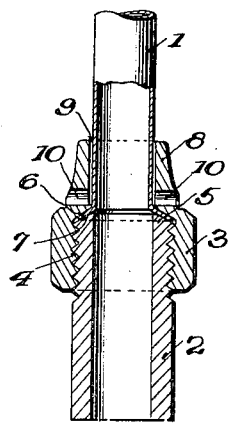
Fig. 1 is a longitudinal section through a coupling or connection embodying the invention.
Figure 4:
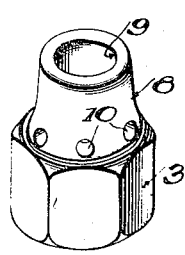
Fig. 4 is a perspective view of the fitting shown in Fig. 1.

Referring first to Figs. 1 and 4, the tube 1 constituting a part, for example, of a refrigerating system is connected by means of the coupling which comprises a fitting member or pipe 2 which may be any suitable part of the system. To make the connection the fitting in the form shown also comprises a coupling nut 3 that is internally threaded at 4 to receive the end of the pipe 2. The nut portion 3 of the fitting is preferably made square or hexagonal or of any other suitable shape, the hexagonal form being shown in Fig. 4. At the end of the threads 4 the nut portion 3 of the fitting is provided with an inclined sealing surface 5, and the end of the tube 1 is flared at 6 to engage said sealing surface and form the desired seal. The flare 6 is clamped against the sealing surface 5 by the other member of the threaded fitting which in this case is the pipe 2 the end of which may be suitably inclined as at 7 to conform to the inclination of the surface 5.

To support the tube 1 an extension or neck 8 is provided as an integral part of the coupling nut, or in any other suitable way, said neck 8 extending from the nut portion 3 beyond the sealing surface and having a bore which receives and surrounds the tube 1 and which may leave a relatively slight clearance between the bore of the nut and the tube. In order to prevent the entry of moisture between the neck 8 and the tube 1 it has heretofore been attempted to effect a tight joint or seal at the point 9. However, any moisture leaking past this point tends to collect between the neck 8 and the tube 1 and to freeze adjacent the point 9 so that it expands inwardly of the fitting. In the form illustrated in Fig. 1, one or more expansion recesses in the form of openings 10 are provided in the neck 8 so that the moisture on freezing can expand outwardly through the openings 10. These openings 10 are positioned beyond the seal at 5 and do not interfere with the functioning of the coupling as a seal, while at the same time expansion is permitted to take place in such a way that no damage results to the fitting or tube or to the seal provided by the coupling. Any suitable number of openings 10 can be provided, said openings preferably being spaced about the periphery of the neck 8. As shown in Fig. 4, one opening is provided for each surface of the hexagonal nut portion 3.

Figure 2:
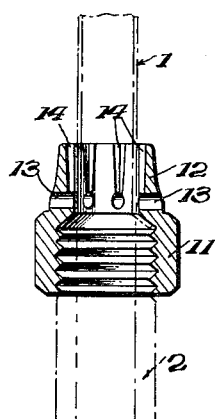
Figs. 2 and 3 are longitudinal sections of other forms of couplings or connections embodying the invention.
Figure 5:
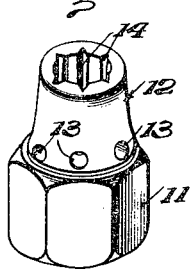
Fig. 5 is a perspective view of the fitting shown in Fig. 2.

If desired, cavities or recesses in communication with the openings may be provided whereby moisture tends to drain toward the openings 10. In the form shown in Figs. 2 and 5, the nut portion 11 and the neck 12 are substantially similar to the nut portion 3 and neck 8 of Fig. 1, the neck 12 being provided with a suitable number of openings 13. Within the neck 12 a plurality of grooves 14 are provided which grooves extend from the end of the fitting inwardly to the openings 13. These grooves 14 form enlargements of the bore of the nut and form spaces within which the moisture may collect and the moisture on freezing expands along the grooves in the direction of the openings 13.

Figure 3:
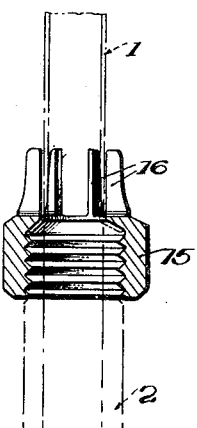
Figure 6:
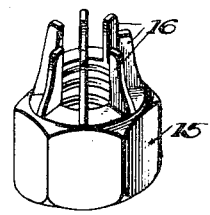
Fig. 6 is a perspective of the fitting shown in Fig. 3.

Figs. 3 and 6 illustrate another form of fitting having a nut portion 15 similar to the nut portion 3 of Fig. 1. For supporting the tube 1, the the fitting is provided with a plurality of arms or fingers 16 which extend from the nut portion and are spaced about the periphery of the tube. These arms or fingers adequately support the tube while at the same time the objectionable effects of freezing of moisture are obviated.

Figure 7:
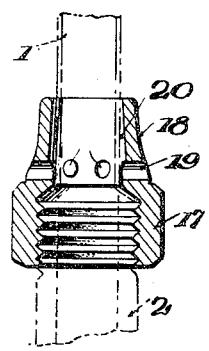
Fig. 7 is a longitudinal section through a further form of coupling or connection embodying the invention.

In the form shown in Fig. 7, the nut portion 17 and the neck 18 are substantially similar to the nut portion 3 and neck 8 of Fig. 1, the neck 18 being provided with suitable openings 19. Within the neck 18, however, the bore is tapered being shown as increasing in diameter inwardly of the fitting to provide an enlargement of the bore or recess 20. The end of the neck 18 contacts with and supports the tube while the recess 20 permits any moisture to expand freely on freezing and insures expansion through the openings 19 in case the quantity of moisture is sufficient.

It will be observed that the several forms of the invention illustrated and described provide means whereby any moisture collecting in the relatively slight clearance between the supporting portion of the coupling nut member of the fitting and the enclosed tube may expand freely in such a direction that no damage results either to the fitting or to the tube. This result is obtained without interfering in any way with the function of the fitting as a support for the tube or with the seal which the coupling or connection is designed to effect. The invention renders it unnecessary to attempt to provide a close fit or seal between the supporting portion of the fitting and the tube and prevents the breaking of the fitting or the collapse of the tube and destruction of the seal which has heretofore occurred.

It will be understood that the invention is not limited to the forms illustrated and described, as variations may be made in the form and details of the fitting and as the invention is capable of a wide variety of mechanical expressions many of which will now occur to those skilled in the art without departing from the spirit of the invention. It will also be understood that the invention is not limited to the type of coupling member or fitting shown but may also be embodied in other known types of fittings. Reference is therefore to be had to the appended claims for a definition of the limits of the invention.

What is claimed is:

1. In a coupling for a thin-walled tube to be subjected to freezing and thawing temperatures and wherein the coupling nut clamps the end of the tube against a fitting member and surrounds the tube with a relatively slight clearance in which moisture may collect and freeze, said coupling nut having means for relieving pressure due to the freezing of moisture in the clearance between the nut and tube, said means including one or more expansion recesses leading from said clearance outwardly to the atmosphere.

2. In a coupling for a thin-walled tube to be subjected to freezing and thawing temperatures and wherein the coupling nut clamps the end of the tube against a fitting member and surrounds the tube with a relatively slight clearance in which moisture may collect and freeze, said coupling nut having means for relieving pressure due to the freezing of moisture in the clearance between the bore of the nut and the tube, said means including a plurality of openings leading from said clearance through the wall of said nut outwardly to the atmosphere.

3. In a coupling for a thin-walled tube to be subjected to freezing and thawing temperatures and wherein the coupling nut clamps the end of the tube against a fitting member and surrounds the tube with a relatively slight clearance in which moisture may collect and freeze, said coupling nut having means for relieving the pressure due to the freezing of moisture in said clearance, said means including an enlargement of said bore and one or more expansion openings communicating with said enlargement and leading to the atmosphere.

4. In a coupling for a thin-walled tube to be subjected to freezing and thawing temperatures and wherein the coupling nut clamps the end of the tube against a fitting member and surrounds the tube with a relatively slight clearance in which moisture may collect and freeze, said coupling nut having means for relieving pressure due to the freezing of moisture in said clearance, said means including one or more expansion recesses extending axially of said nut and communicating with said clearance and the atmosphere.

SEBASTIAN KARRER.